Figure 1:
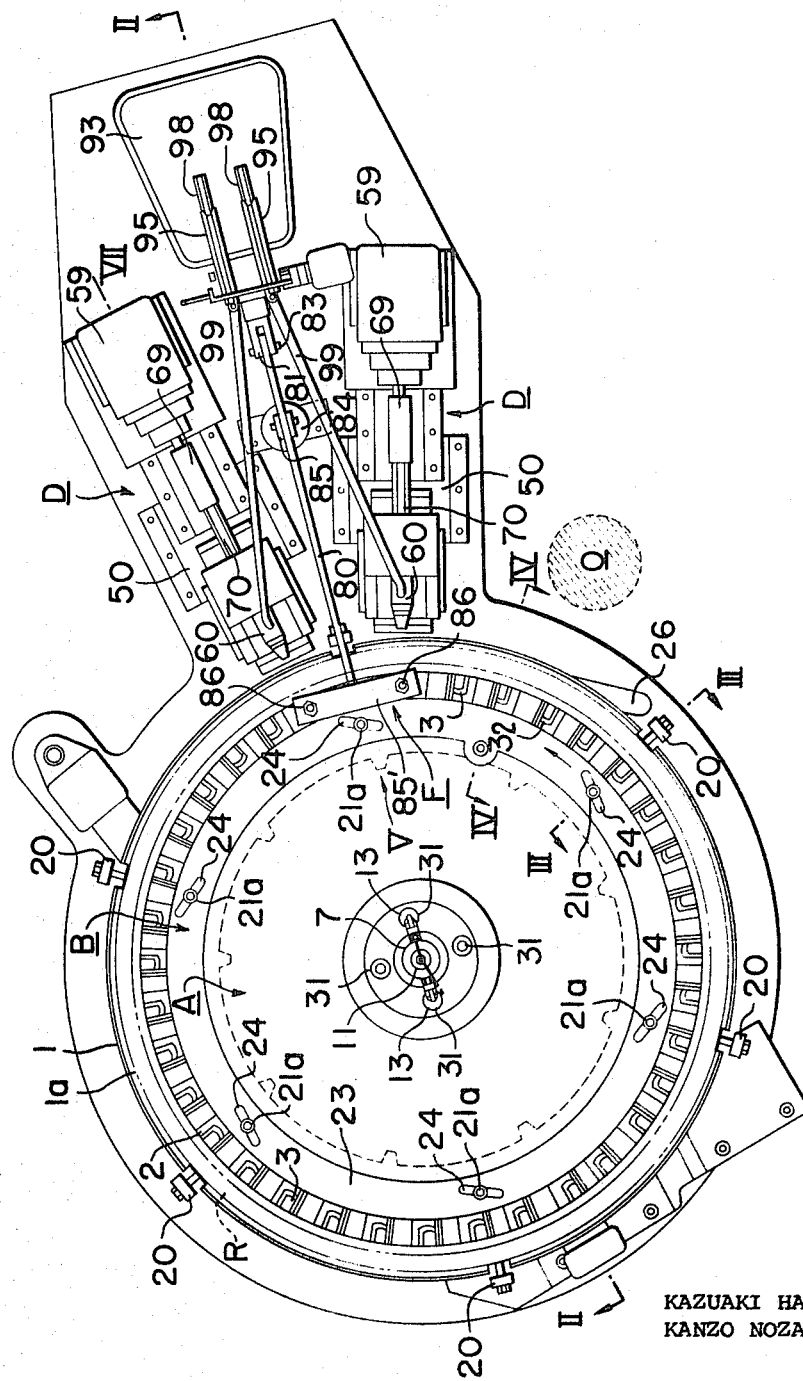

United States Patent

[11] 3,631,577

[72] Inventors Kazuaki Hasegawa
Tokyo;
Kanzo Nozaki, Kawaguchi, both of Japan
[21] Appl. No. 846,669
[22] Filed Aug. 1, 1969
[45] Patented Jan. 4, 1972
[73] Assignee Japan Bicycle Promotion Institute
Tokyo, Japan
[32] Priority June 6, 1969
[33] Japan
[31] 44/43950

[54] MACHINE FOR PROVISIONALLY ASSEMBLING WIRE SPOKE WHEELS
8 Claims, 24 Drawing Figs.

[52] U.S. Cl. .................................................. 29/211
[51] Int. Cl. .................................................. B23q 7/10
[50] Field of Search .................................. 29/211, 211 D, 240

[56] References Cited
UNITED STATES PATENTS
3,153,842  10/1964  Williams.................... 29/240 X
3,456,326   7/1969  Batten........................ 29/211
3,522,645   8/1970  Kennicott.................... 29/211 X

*Primary Examiner*—Harrison L. Hinson
*Attorney*—Wenderoth, Lind & Ponack

ABSTRACT: A provisionally assembling machine for wire spoke wheels, characterized in that such machine includes a rim positioning table rotatably mounted together with a shaft including a hub supporting cylinder. A rim retainer is disposed on the peripheral portion of the rim positioning table for catching the rim loaded thereon at portions of the outer periphery thereof when the retainer is moved radially inwardly on such peripheral portion. Means is provided for intermittently driving the rim positioning table. Driver means arranged in the proximity of the rim positioning table and has its shaft driven by an electric motor. Means for displacing the driver means in the vertical direction for a predetermined distance and also for advancing or retreating the same towards or away from the rim positioning table is provided. A device spoke holding device movable in the vertical direction with respect to the rim positioning table and adapted to clamp the spoke together with the rim positioning table when the spoke holding device is at its lower position is included. A nipple supply is provided for supplying nipples one by one to the driver means. During the period when the rim positioning table is stationary, the spoke holding device is lowered to hold the spoke which is bridged across the hub and the rim, and simultaneously the driver is advanced to threadedly mate the nipple with the tip of the spoke.

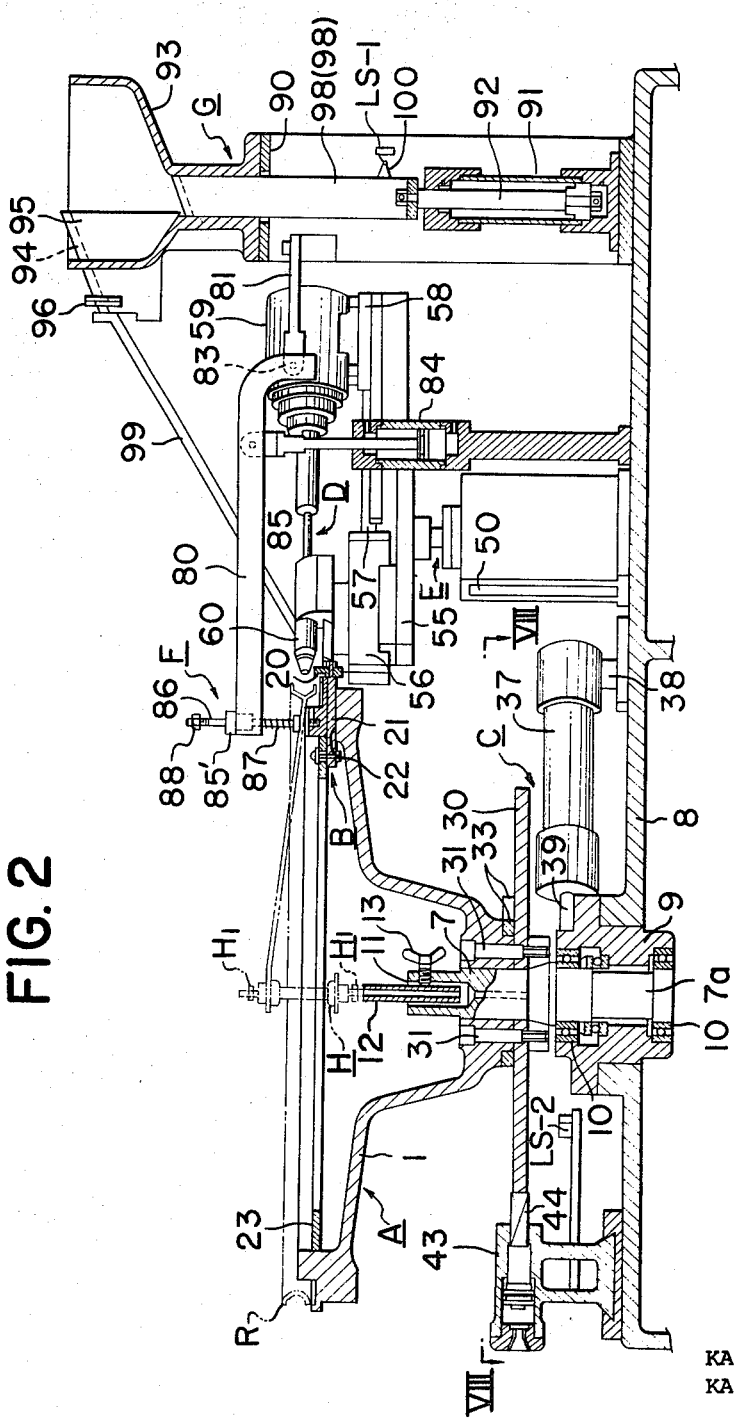

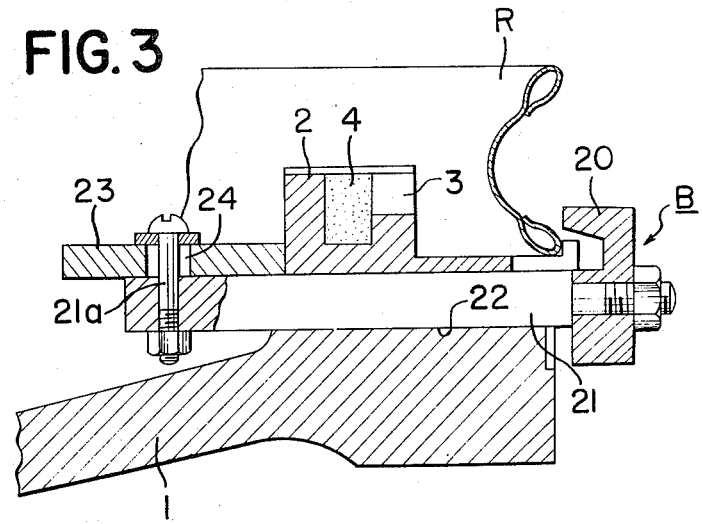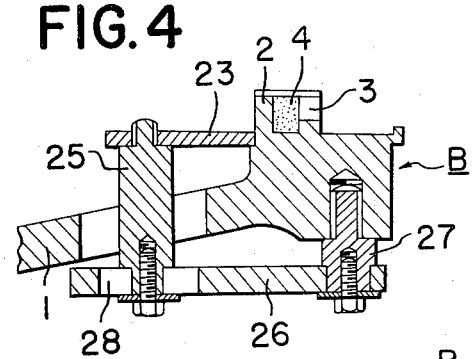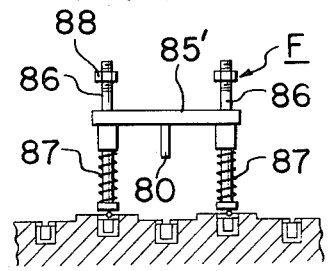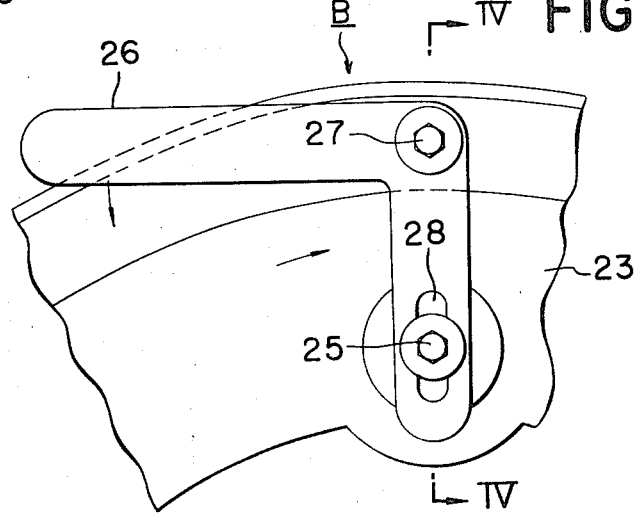

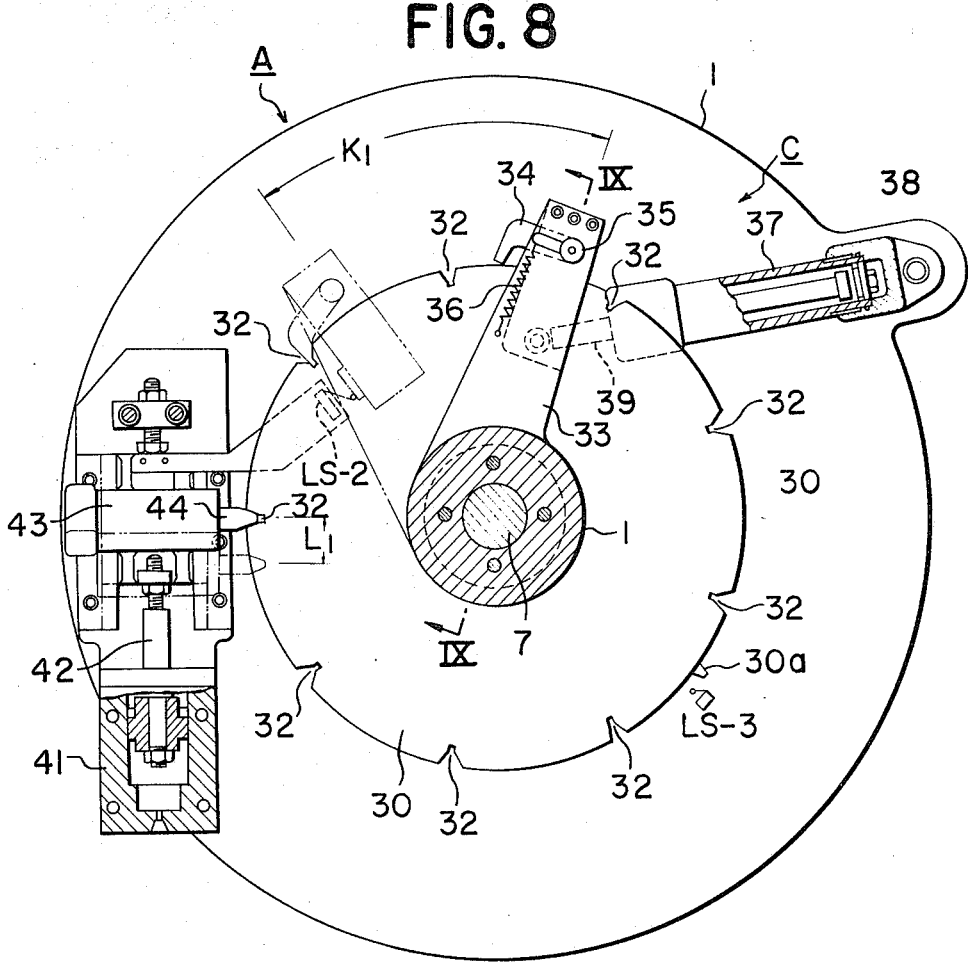
FIG. 8
FIG. 9
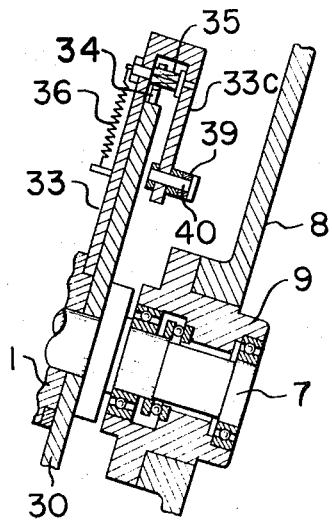
KAZUAKI HASEGAWA and
KANZO NOZAKI,
INVENTORS
BY Wendroth, Lind & Ponack
ATTORNEYS

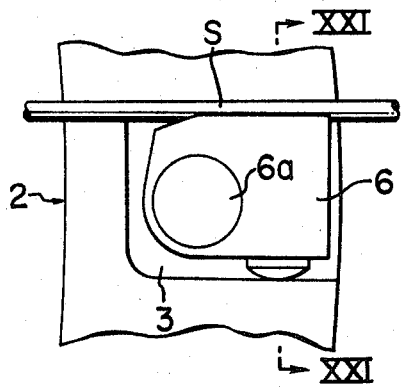
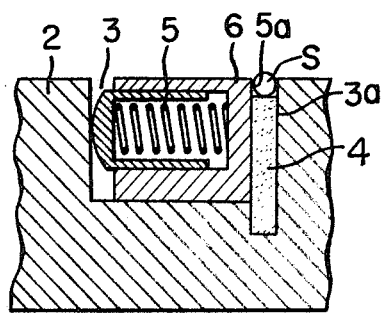
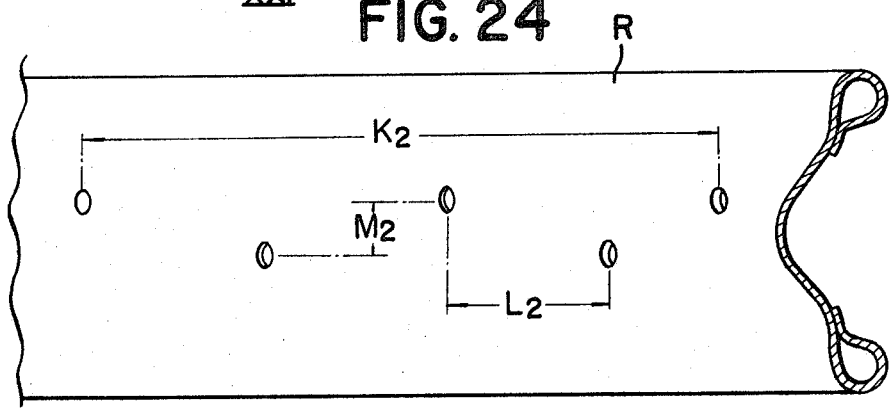
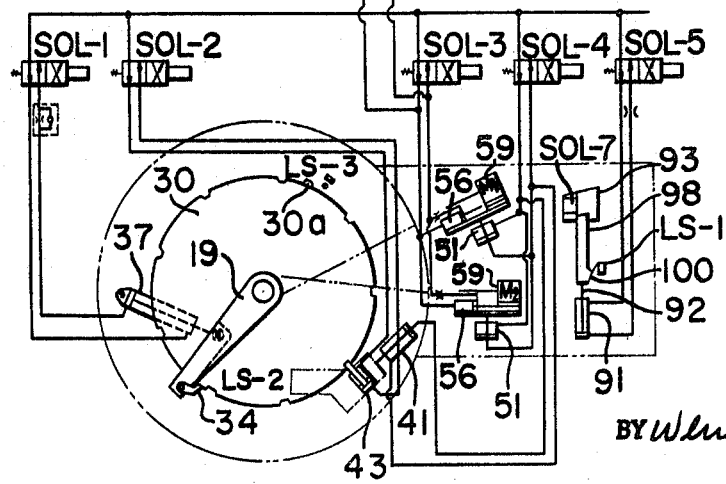
KAZUAKI HASEGAWA and
KANZO NOZAKI,
INVENTORs

MACHINE FOR PROVISIONALLY ASSEMBLING WIRE SPOKE WHEELS

The present invention relates to a machine for provisionally assembling wire spoke wheels which consist of a hub, a rim and a plurality of wire spokes.

The wire spoke wheel used in a bicycle or the like, consists of a hub located at its center, a rim positioned along its outer periphery, and a plurality of wire spokes for interconnecting the hub and rim. Upon assembling these parts in a factory, it is required that while the hub is set at the center position of the rim, the wire spokes having their one ends anchored to the hub are interlaced with one another and simultaneously the other ends thereof are respectively positioned in the spoke holes on rim, and then nipples are threadedly mated with these end portions in a loose manner to provisionally assemble the hub, rim and wire spokes. Such a provisionally assembled wheel is then sent to a main fastening process, where the nipples threadedly mated with the other ends of the wire spokes are finally fastened to integrally couple the hub, the rim and the plurality of wire spokes.

Thus, two processes are necessary until a wire spoke wheel has been completely assembled, and with regard to the latter main fastening process, a novel nipple fastening apparatus has been already proposed and is in practical use. In this apparatus, driver shafts driven by a torque motor are provided equal in number to the nipples in such manner that they are opposed to the respective nipples of the provisionally assembled wheel which is set in position. Therefore, if such apparatus is used, the same process may be entirely automated and the final fastening of the nipples can be carried out quickly. However, since the former provisional fastening process was carried out manually in the past, the assembling time per one wheel was necessarily longer than 4 minutes, and thus the efficiency was poor, resulting in an increase in manufacturing cost. In addition, because the thread-mating of the nipple was carried out manually in such prior art process as described, the number of turns for thread-mating was random for each nipple, so that upon carrying out the final fastening by means of the nipple fastening apparatus, the time when the fastening of the each driver shaft ends was different according to the number of necessary turns for thread-mating, and thus it resulted in a disadvantage that loss time occurred during the working.

The present invention has been proposed in view of the above-mentioned background of the art, and a principal object of the invention is the provision of a novel machine for provisionally assembling wire spoke wheels which automatically carries out the provisional fastening of the nipples onto the respective wire spokes.

Another object of the present invention is the provision of a novel machine for provisionally assembling wire spoke wheels which, during such provisional assembling, equalizes the number of necessary turns for thread-mating the nipple with each wire spoke for all the spokes.

Still another object of the present invention is the provision of a novel machine for provisionally assembling wire spoke wheels which, upon provisional assembling, holds the hub, rim and wire spokes in predetermined positions, respectively, to achieve the provisional assembling operation smoothly.

In order to achieve the aforementioned respective objects, the present invention is characterized in that the provisional assembling machine includes a rim positioning table rotatably mounted together with a shaft including a hub supporting cylinder, rim retainer means disposed on the peripheral portion of the rim positioning table for catching the rim loaded thereon at portions of its outer periphery when the retainer is moved radially inwardly on such peripheral portion. Also, means are provided for intermittently driving the positioning table, driver means are arranged in the proximity of the rim positioning table and have its shaft driven by electric motor means. Furthermore, means for displacing the driver means in the vertical direction for a predetermined distance and also advancing or retreating the same towards or away from the rim positioning table, spoke holding means movable in the vertical direction with respect to the rim positioning table and adapted to clamp a spoke together with the rim positioning table when the spoke holding means is at its lower position, the nipple supply means for supplying nipples one by one to the driver means are provided. During the period when the rim positioning table is stationary, the spoke holding means is lowered to hold the spoke which is bridged across the hub and the rim, and simultaneously the driver means is advanced to threadedly mate the nipple with the tip of the spoke.

Due to the fact that the provisional assembling machine according to the present invention comprises, as described above, a rim positioning table rotatably mounted together with a shaft including a hub supporting cylinder, rim retainer means disposed on the peripheral portion of the rim positioning table for catching the rim loaded on the rim positioning table at some portions of its outer periphery when the retainer is moved radially inwardly on such peripheral portion, means for intermittently driving the positioning table, driver means arranged in the proximity of the rim positioning table and having its shaft driven by electric motor means, means for displacing the driver means in the vertical direction for a predetermined distance and also advancing or retreating the same towards or away from the rim positioning table, spoke holding means movable in the vertical direction with respect to the rim positioning table and adapted to clamp a spoke together with the rim positioning table when the spoke holding means is at its lower position, and nipple supply means for supplying nipples one by one to the driver means; when the hub shaft is set on the supporting cylinder and simultaneously the rim is loaded on the rim positioning table, and when the rim retainer means is moved radially inwardly on the peripheral portion of the rim positioning table so as to make the retainer means catch portions of the outer periphery of the rim, the rim becomes rigidly set at a predetermined position on the rim positioning table. Further, if the intermittent driving means is started, the rim positioning table as well as the hub and rim set on the table are rotated intermittently, so that the spoke holes on the same circumferential row are stopped in succession at the position opposing to the driver means. Now, if the respective wire spokes anchored at their one ends to the hub are interlaced and caused to project at the other ends outwardly through the spoke holes of the rim, and on the other hand the electric motor means for the driver means, the displacing means for the driver means, the spoke holding means, and the nipple supply means are started; then the driver shaft rotates, the nipples are supplied one by one to the driver means, the driver means supplied with a nipple advances toward the spoke hole in a stationary state and simultaneously the spoke holding means is lowered to clamp the spoke together with the rim positioning table, and thus the nipple is threadedly mated with the tip of the spoke located in the spoke hole with the spoke fixed in position. In this connection, the driver means and said spoke holding means are respectively displaced backwardly and upwardly away from the rim positioning table during the period when the rim positioning table is moved. Still further, since the displacing means for the driver means operates to displace the driver means either upwardly or downwardly for a predetermined distance when the intermittently driven rim positioning table has made one complete revolution and thus the above-mentioned operation has been completed in the proximity of the respective holes along the same row in the circumferential direction of the rim, the same operation as described above may be carried out in the proximity of the respective spoke holes along the other row in the circumferential direction of the rim, and thereby the nipples are threadedly mated with all of the spokes. Therefore, the provisional assembly of wire spoke wheels may be carried out automatically, so that the necessary time for provisionally assembling one wheel may be reduced remarkably (about to one-third) in comparison with the prior art manual operation, and thus the manufacturing cost may be greatly lowered.

Also, according to the present invention, as described, when the nipple is threadedly mated with the tip of the spoke, the rim is fixedly secured to the rim positioning table by means of the rim retainer means and the spoke is clamped by means of the spoke holding means and the rim positioning table, so that the relative positioning of the rim and the spoke upon thread-mating of the nipple can be assured. Furthermore, since the spoke is then rigidly held on the rim positioning table, even when the spoke is pushed towards the hub by the intermediary of the supplied nipple as the driver shaft is advancing, the spoke is never bent but held in a straight state. Therefore, in combination with the fixed advancing distance of the driver shaft, it results in equalization of the number of turns for thread-mating the nipple in any portion, so that when the provisionally assembled wheel is sent to the main fastening process the aforementioned nipple fastening apparatus will fasten all the nipples in the same period of time and thus the above-referred loss time during assembly will be completely obviated.

In addition, according to the present invention, as described, the rim positioning table is intermittently driven, the rim retainer means is moved radially inwardly on the peripheral portion of the rim positioning table, the driver means is displaced in the vertical direction for a predetermined distance and also advanced or retreated towards or away from the rim positioning table, and the spoke holding means is movable in the vertical direction with respect to the rim positioning table, so that the provisional assembling work for the wheel including complex interlaced wire spokes, can be achieved smoothly.

Figure 7:
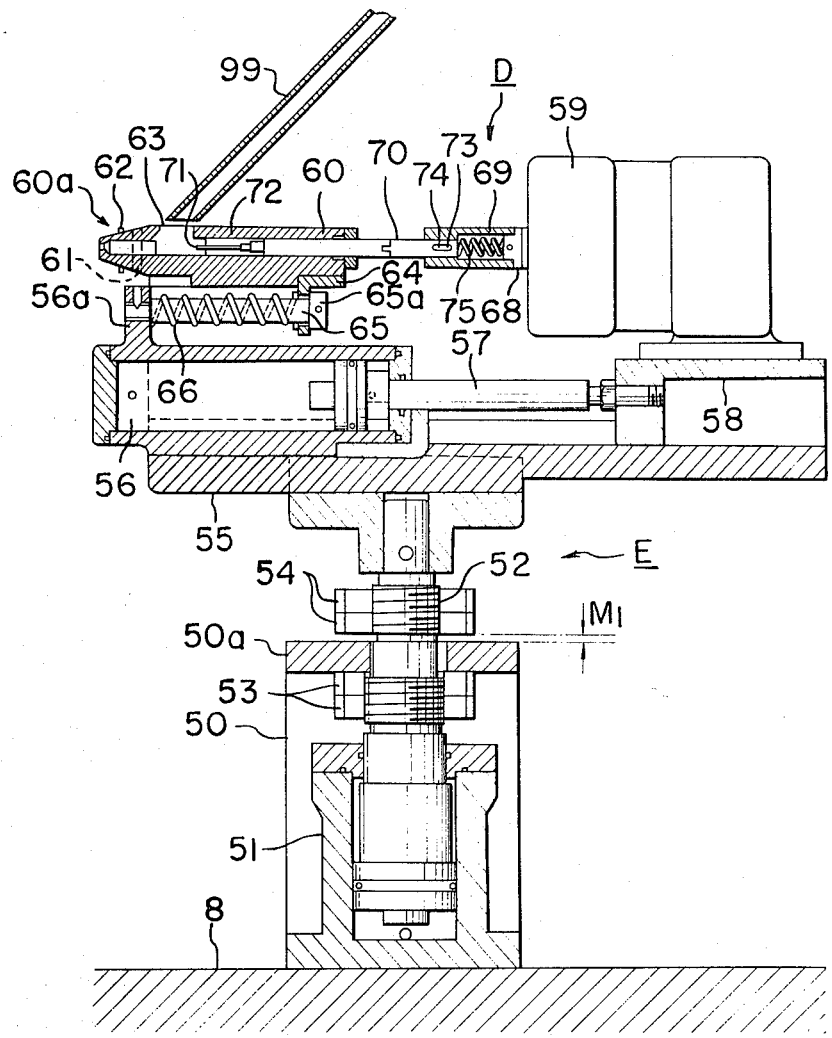
Figure 10:
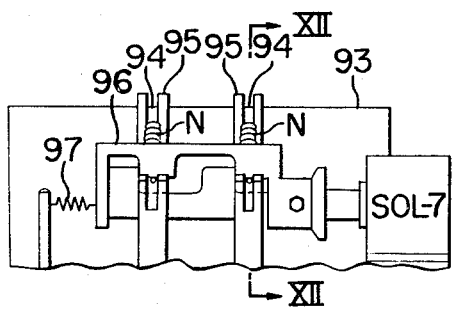
Figure 11:
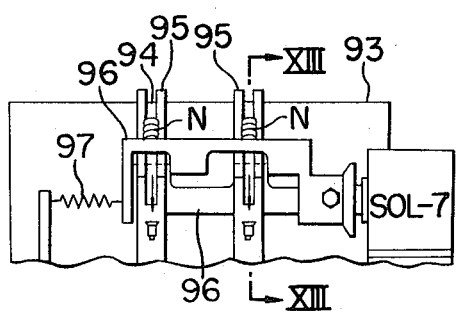
Figure 12:
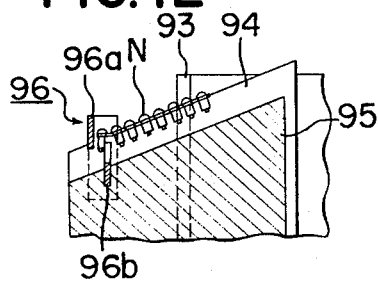
Figure 13:
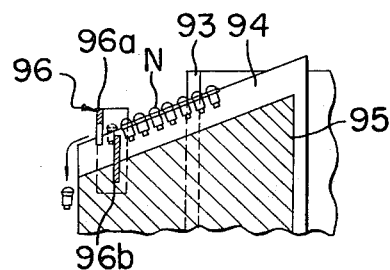
Figure 14:
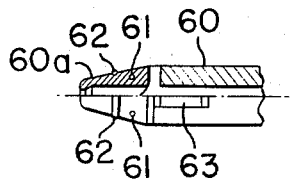
Figure 15:
Figure 16:
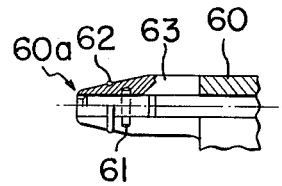
Figure 17:
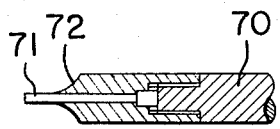
Figure 18:
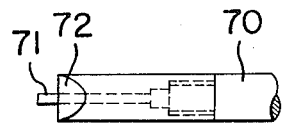
Figure 19:
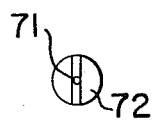
Figure 23:
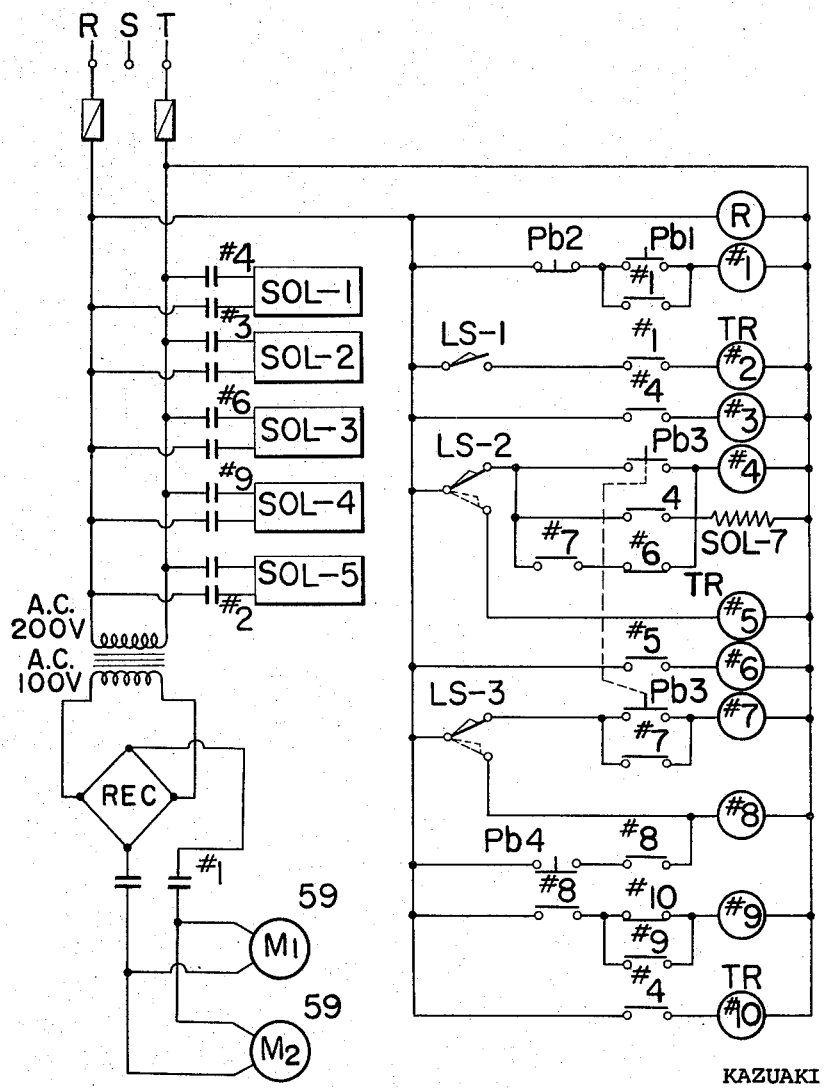

Other features and advantages of the present invention will become apparent from the following description of a preferred embodiment as illustrated in the accompanying drawings, in which:

FIG. 1 is a plan view showing one preferred embodiment of the machine for provisionally assembling wire spoke wheels according to the present invention, FIG. 2 is a longitudinal cross section side view taken along line II—II in FIG. 1 as viewed in the direction of the arrows, FIG. 3 is a longitudinal cross section side view taken along line III—III in FIG. 1 as viewed in the direction of the arrows, FIG. 4 is a longitudinal cross section side view taken along line IV—IV in FIGS. 1 and 6 as viewed in the direction of the arrows, FIG. 5 is a partial side view partially cut away as viewed in the direction of arrow V in FIG. 1, FIG. 6 is a bottom view of the part shown in FIG. 4, FIG. 7 is a longitudinal cross section side view taken along line VII—VII in FIG. 1 as viewed in the direction of the arrows, FIG. 8 is a transverse cross section plan view taken along line VIII—VIII in FIG. 2 as viewed in the direction of the arrows, FIG. 9 is a longitudinal cross section side view taken along line IX—IX in FIG. 8 as viewed in the direction of the arrows, FIGS. 10 and 11 are front views showing the details of the nipple supply device, FIGS. 12 and 13 are longitudinal cross section side views taken respectively along line XII—XII in FIG. 10 and along line XIII—XIII in FIG. 11 as viewed in the direction of the arrows, FIG. 14 is a plan view, partially in transverse cross section, showing a part of the nipple thread-mating device, FIG. 15 is a front view of the same, FIG. 16 is a side view, partially in longitudinal cross section, of the same, FIG. 17 is a longitudinal cross section side view showing another part of the nipple thread-mating device, FIG. 18 is a plan view of the same, FIG. 19 is a front view of the same, FIG. 20 is a plan view of a spoke holding device, FIG. 21 is a longitudinal cross section front view taken along line XXI—XXI in FIG. 20 as viewed in the direction of the arrows, FIG. 22 is a hydraulic system diagram of the entire provisional assembling machine, FIG. 23 is an electric circuit diagram of the same, and FIG. 24 is a side view showing a part of the rim to be provisionally assembled.

The present invention will be described in more detail hereinafter with reference to a preferred embodiment illustrated in FIGS. 1 through 23. The entire machine consists of a rim positioning table A, a rim retainer device B, an intermittent driving mechanism C for said rim positioning table A, a driver device D, a mechanism E for displacing said driver device D in the vertical direction for a predetermined distance and also in the forward and backward directions, a spoke holding device F, and a nipple supply G.

At first, description will be made with reference to the rim positioning table A. The rim positioning table formed in a cuplike shape is shown at 1, and on its outer peripheral portion are formed a rim loading surface 1a and a ridge 2, said ridge 2 being provided with notches 3 equal in number with that of the spokes at equal intervals. Further, in each of said notches 3 is fixedly secured a permanent magnet 4 as shown in detail in FIGS. 3, 4, 20 and 21, and also a holding piece 6 for the spoke is pivotably mounted on a shaft 6a, which is normally urged towards the permanent magnet 4 by a spring 5. Accordingly, the spoke is inserted into the notch 3 while said holding piece 6 is rotated around the shaft 6a, and within said notch 3 it is held by a recess 5a of the holding piece 6, one side 3a of the notch 3 and the permanent magnet 4 softly to such extent that it may not be subjected to a random motion upon intermittent driving of the rim positioning table 1 as described later, as shown in FIGS. 20 and 21. At the center of rim positioning table 1 is fixedly secured a 7, the lower portion 7a thereof shaft being inserted into a support 9 fixed on a machine base 8, and between the support 9 and the shaft 7 are disposed bearings 10. 11 indicates a bore drilled in the upper portion of shaft 7, 12 indicates a cylinder for supporting a shaft $H_1$ of a hub H, and cylinder 12 is fitted into bore 11 and may be fixed with respect to the shaft 7 by fastening a thumb-screw 13, and also the height of the cylinder 12 may be adjusted to any desired level. The illustrated embodiment concerns a machine for provisionally assembling wheels having 36 spokes, so that 36 notches are provided.

With regard to the rim retainer device B, 20 indicates a holding piece for a rim R which is provided, in the case of the illustrated embodiment, at each of six positions in the proximity of the rim positioning table, each holding piece 20 being fixedly secured to the outer end of a rod 21 as shown in FIG. 3. Rod 21 is loosely fitted in a bore 22 radially extending through the rim positioning table 1. At the inner end portion of each rod 21 is fixedly secured a bolt 21a, the upper end of which is located in an obliquely elongated hole 24 in an annular member 23 which is rotatably supported along the inner side of ridge 2. At any arbitrary position (the position of line IV—IV in FIG. 1 in the illustrated embodiment) of annular member 23 is fixedly secured a pivot rod 25 downwardly as shown in FIG. 4, and also on the bottom surface of the rim positioning table 1 along line IV—IV is pivotably supported a lever 26 by means of a shaft 27, so that the lower end of pivot rod 25 is inserted in an elongated hole 28 of lever 26 as shown in FIG. 6. Therefore, when the lever 26 is actuated in one or the other direction, the annular member 23 rotates around the shaft 7 in one or the other direction, so that the rod 21 and the holding piece 20 are either advanced or retreated in the radial direction of the rim positioning table 1 by the intermediary of the obliquely elongated holes 24, resulting in fixing or release of the rim R on the loading surface 1a at the six positions.

Now the intermittent driving mechanism C for the rim positioning table A will be described. In FIGS. 2 and 8, 30 indicates a rotary disc affixed to the bottom of rim positioning table 1 by means of bolts 31, and at equal intervals along the outer periphery of the disc are provided a plurality of notches 32, the number of which is determined by the number of spokes and the number of driver devices as described later. More particularly, in case the number of spokes is 36 and the number of driver devices as described hereinafter provided are two, then notches are provided at nine equal intervals, which are equal to one-fourth of the total number of spokes. 33 indicates an advancing plate which is loosely inserted between the bottom of rim positioning table 1 and the rotary disc 30 and adapted to be rotated around the shaft 7 at the center over a predetermined range (See $K_1$ in FIG. 8). As shown in FIGS. 8 and 9, an advancing claw 34 is pivotably mounted at the tip portion of the advancing plate by a shaft 35 and is urged into contact with the outer peripheral surface of rotary disc 30 by means of a spring 36. 37 indicates a cylinder having its rear end pivotably mounted on the machine base 8 for rotating the advancing plate, and the piston rod 39 of the cylinder and the turned up portion 33a of advancing plate 33 are interconnected with each other by the intermediary of a rotatable pin 40. In the illustrated embodiment, range $K_1$ is equivalent to two times $K_2$ the interval between adjacent spoke holes along the same row as shown in FIG. 24. 41 indicates a cylinder fixedly secured to the machine base 8, while 42 indicates a piston rod thereof, the extremity of which is coupled to another cylinder 43 having a piston rod 44 and being slidably mounted on the machine base 8. Therefore, the actuation of cylinder 43 reciprocates the piston rod 44 and causes the same to engage or disengage with the notch 32 opposed to said piston rod 44, and when it engages with the notch 32, it serves to fix the rim positioning table 1 by the intermediary of the rotary disc 30. On the other hand, the other cylinder 41, upon its actuation, reciprocates cylinder 43 and piston rod 44 over a predetermined range (See $L_1$ in FIG. 8), and if the piston rod 44 is engaged with the notch 32, it results in an equivalent amount of rotation of the rotary disc 30 and the rim positioning table 1. Range $L_1$ is, in the illustrated embodiment, equivalent to the distance $L_2$ between the adjacent spoke holes on adjacent rows as shown in FIG. 24. LS–2 indicates a limit switch which is actuated by contact with the turned-up portion 33a of advancing plate 33 when such plate 33 has been rotated to the position represented by double dot-dash lines, while LS–3 indicates another limit switch which is actuated by contact with a projection 30a on rotary disc 30 when such projection has been rotated to that position.

Description will be made now with reference to the driver device D and the mechanism E for displacing driver D in the vertical direction for a predetermined distance and also in the forward and backward directions. In the illustrated embodiment, a pair of driver devices D are provided as shown in FIG. 1. However, as they have the same structure, only one of them will be described. In FIGS. 1, 2 and 7, 50 indicates a frame member fixedly secured on the machine base 8, and inside of each frame member is fixed a cylinder 51 containing a piston rod 52. Near the portion of piston rod 52 extending through the upper wall 50a of frame member 50, are fixedly secured limit plates 53, 54 on the respective sides of upper wall 50a for limiting the vertical movement of the piston rod 52 to within a predetermined range (See $M_1$ in FIG. 7). In this connection, in the illustrated embodiment, range $M_1$ is equivalent to the distance $M_2$ between the respective rows of spoke holes as shown in FIG. 24. At the upper end of piston rod 52 is fixedly secured a platform 55, on one side of which is rigidly mounted a cylinder 56, while on the other side of which is mounted a sliding pedestal 58 including an electric motor 59 in such manner that it can be displaced in the forward or backward direction, and also a piston 57 of cylinder 56 is coupled to pedestal body 58. 60 indicates a nipple retainer cylinder with a tip portion 60a having a diameter gradually reduced towards its extremity, tip portion 60a being formed of a plurality of pieces as shown in FIGS. 14 to 16 (in these figure, two pieces), and also adapted to be opened outwardly about pins 61 as pivots, but normally held at the closed position as illustrated by means of an annular resilient piece 62. 63 indicates a nipple supply opening provided in the front part, and 64 indicates a support piece fixedly secured to the rear part of cylinder 60 and which is in turn mounted slidably on a guide rod 65 that is integrally formed with an arm 56a extending from cylinder 56.

Between support piece 64 and the arm 56a is inserted a spring 66. Therefore, the retainer cylinder 60 is normally retreated to a position where the support piece 64 makes contact with a stopper 65a at the rear end of the guide rod 65. 68 indicates an output shaft of electric motor 59 having a joint 69, and 70 indicates a driver shaft having its front part loosely inserted into retainer cylinder 60. At the tip of driver shaft 70 are mounted a thin rod piece 71 to be loosely inserted into the bore of the nipple and a thin strip 72 to be engaged with the slot provided on the head of the nipple as shown in FIGS. 17 to 19. The rear end of driver shaft 70 is accommodated within joint 69 so that they are connected by means of an elongated hole 73 in the shaft 70 and a pin 74 of the joint 69, and in addition a buffer spring 75 is inserted between the rear end of the shaft 70 and output shaft 68. Therefore, while the driver shaft 70 is displacable in the axial direction, it can rotate together with the output shaft 68. The extremity 71 of the driver shaft 70 retreats up to the position just beneath the rear edge of the nipple supply opening 63 when the electric motor 69 is retreated.

Referring now to the spoke holding device F, such device F is located in the middle of pair of driver devices D as shown in FIG. 1. In FIGS. 1, 2 and 5, 80 indicates a rocking bar, 81 indicates a fixed arm extending from the nipple supply G as described later, the rocking bar 80 being pivotably mounted to the arm 81 via a pin 83, a piston rod 85 of a cylinder 84 being pivotably mounted to the rocking bar 80, and cylinder 84 is fixedly secured to the machine base 8. The front end of rocking bar 80 is located right above the ridge 2 on the rim positioning table 1. In addition, 85' indicates a cross arm fixedly secured to the extremity of rocking bar 80. 86 indicates push rods loosely inserted through the opposite wing portions of cross arm 85', and both the push rods 86 are separated by a distance equal to one-half times $K_2$ shown in FIG. 24, that is the distance between adjacent spoke holes along the same row. Each of the push rods 86 is urged downwardly by a spring 87 inserted between cross arm 85' and the lower end portion of the same push rod 86, but its lower limit position is limited by a nut 88.

Referring now to the nipple supply G, in FIGS. 2 and 10 through 13, 90 indicates a frame body affixed to the machine base 8, within which is mounted a cylinder 91 having a piston rod 92. 93 indicates a hopper fixedly secured to frame body 90, and in front of hopper 93 are provided two chutes 95, which are inclined in the forward and downward direction and include channels 94 for aligning the nipples N so that their heads may be directed upwardly. In addition, in the front part of these chutes 95 are movably disposed partition plates 96 transversely thereof, and one end of which is coupled to a solenoid SOL–7. Therefore, when the solenoid SOL–7 is deenergized and thus the partition plates 96 move leftwards as shown in FIG. 10, the foremost nipple N is located between the front plate 96a and the rear plate 96b as shown in FIG. 12. On the other hand, when the solenoid SOL–7 is energized to shift the partition plates 96 rightwards as shown in FIG. 11, the foremost nipple N is caused to fall as shown in FIG. 13 and also the rear plate 96 b prevents the next succeeding nipple N from falling. Further, 98 indicates a nipple scoop-up piece, which reciprocates in the vertical direction together with piston rod 92 and has its upper portion formed similarly to chute 95. As it is raised, it scoops up the nipples within the hopper 93 so that their heads may be directed upwardly, and when upper edge of nipple scoop-up piece 98 comes in alignment with the upper edge of chute 95, it supplies the scooped nipples to the chute 95. In addition, 99 indicates a passageway for the falling nipples which extends from the falling position of nipples N to the position of the nipple supply opening 63 when retainer cylinder 60 is retreated, and LS–1 indicates a limit switch which is actuated when it contacts with a projection 100 on scoop-up piece 98.

In FIGS. 22 and 23, SOL–1 indicates an operating solenoid of a valve for switching a hydraulic path for the cylinder 37 in the driving mechanism C of the rim positioning table, SOL–2 indicates another operating solenoid of a valve for switching a hydraulic path for the cylinder 43 in the same mechanism C, SOL-3 indicates another operating solenoid of a valve for switching hydraulic paths for the cylinders 56 in the driver devices D and the cylinder 84 in the spoke holding device F, respectively, SOL-4 indicates another operating solenoid of a valve for switching hydraulic paths for the cylinder 41 in the rim positioning table driving mechanism C and the cylinder 51 in the driver, and SOL-5 indicates another operating solenoid of a valve for switching a hydraulic path for the cylinder 91 in the nipple supply G. $Pb_1$, $Pb_2$, $Pb_3$ and $Pb_4$ respectively indicate pushbutton switches, TR indicates a timing relay, and 01 through 010 respectively indicate relays.

Although the illustrated apparatus is constructed in such manner that a holding piece 6 is provided within each notch 3 in the ridge 2 disposed on the rim positioning table 1 so as to make holding piece 6 temporarily hold the spoke S, the holding piece 6 is not always necessary, since the same function may be achieved by means of the permanent magnet 4 only.

Now the operation of the aforementioned preferred embodiment of the invention will be described. At first, the pushbutton switch $Pb_1$ is depressed to actuate the relay 01. As a result, the electric motors 95 for driving the driver shafts begin to rotate and thus the driver shafts start rotation. Since the limit switch LS-1 is initially closed, the actuation of relay 01 causes the timing relay for nipple supply TR-02 to operate. Accordingly the solenoid SOL-5 operates to actuate the cylinder 91 in the nipple supply G, and thus causes the scoop-up piece 98 to go up and down at a predetermined time interval. As the scoop-up piece 98 goes up, it scoops up the nipples accommodated within the hopper 93 so that the heads of the nipples may be directed upwards, and when the upper edge of the same piece 98 comes into alignment with the upper edge of the chute 95, it causes the nipples to fall into the chute 95 so that they may be aligned in the state as shown in FIG. 12. In parallel to the above-mentioned operation, the operator sets a rim R on the rim positioning table 1, more particularly, on its rim loading surface 1a, and after the respective notches 3 have been made to oppose the respective spoke holes, he forcibly turns the lever 26 in the direction of an arrow shown in FIG. 6 to rotate the annular body 23 in the direction of the other arrow shown in the same figure (viewing in FIG. 1, the direction of rotation is reversed) for advancing the respective rods 21 and the respective holding pieces 20 towards the center of the rim positioning table 1, and thus fixedly secures the lower outer periphery of the rim R at a plurality of positions (at six positions in the illustrated embodiment) by means of the respective holding pieces 20. Then, after the shaft $H_1$ of the hub H is screwed into the support cylinder 12 so as to stand up vertically and simultaneously two of the spokes S are hooked at their head portions to two of the spoke holes in the lower side flange (In this connection, there are two types of hubs, that is, "normal hole" type and "hook hole" type. In the case of the former type, after the spokes have been threaded through all the spoke holes, the hub is set as described above, while in the case of the latter type, the hub is set to start the provisional assembling work, without the spokes threaded in the holes. However, since the sequence of the steps are the same for the both, the latter type is assumed in the following description.), the operator standing at the position 0 in FIG. 1 carries out interlacing of the spokes, so that the proximities of the threaded tip end portions of the spokes are located in the notches $2_1$, $3_2$ (every other notch) near to the operator and simultaneously the threaded tip portions are located in the spoke holes of the rim R opposing notches $3_1$, $3_2$, respectively, and thus the two spokes are set in the provisional assembling position by means of the holding piece 6 and the permanent magnet 4 as shown in FIG. 21. Then the pushbutton switch $Pb_2$ is depressed. As a result, the relays 03 and 04 are actuated to operate the solenoids SOL-2 and SOL-1, respectively, which open one of their hydraulic paths to actuate one cylinder 37 and another cylinder 43 in the driving mechanism C, in the following manner:—In the cylinder 43, the piston rod 44 is retreated and disengaged from the notch 32 to maintain the rim supporting table 1 in a rotatable state, while in the cylinder 37, the piston rod 39 is advanced to displace the advancing plate 33 forwardly over the range $K_1$ as shown in FIG. 8, for rotating the rotary disc 30 and the rim positioning table 1 by one unit (40° in the illustrated embodiment) by means of the advancing claw 34 and the notch 32 which are engaged with each other, and thereby feeds the two spokes S, which have been already set as described, to the position of the driver devices D. When pushbutton switch $Pb_3$ is depressed, the solenoid SOL-7 is also actuated, so that the partition plates 96 are pulled rightwards as shown in FIG. 11, and allow one nipple on each of the chutes 95 to fall into the nipple retainer cylinder 60 through the path 99 with the foot of the nipple directed forwardly. On the other hand, since advancing plate 33, upon completing its forward displacement, contacts its turned up portion 33a to the limit switch LS-2, the relays 03 and 04 are disconnected so that the solenoids SOL-2 and SOL-1 are actuated to open the other hydraulic paths, respectively. Accordingly, in cylinder 43, the piston rod 44 is advanced so that the tip portion of the piston rod is engaged with the next notch 32 to fix the rim positioning table 1, while in the cylinder 37, the piston rod 39 is displaced backwardly to return the advancing plate 33 to the position depicted by a solid line. In addition, when the turned-up portion 33a of the advancing plate 33 contacts the limit switch LS-2 as described above, the timing relay TR-05 starts to operate, and thus the solenoid SOL-3 is actuated to open one of the hydraulic paths. Therefore, the cylinder 84 of the spoke holding device F begins to operate so as to lower the piston rod 85 for descending the push rod 86 by the intermediary of the rocking bar 80 and the cross arm 85', and thereby the push rod 86 clamps each of the spokes fed in front of the driver devices D together with the ridge 2 on the rim positioning table 1. Also, the actuation of the solenoid SOL-3 causes the operation of the cylinders 56 in the driver devices D, so that the rotating driver shafts 70 are advanced along the axes of the nipple retainer cylinders 60 by the intermediary of the piston rods 57, the sliding pedestals 58, and the electric motors 59, whereby the thin rod portions 71 may be threaded through the center bores of nipples N which have fallen into the retainer cylinders 60 with their feet directed forwardly, and simultaneously the thin strip portions 72 may be engaged with the slots on the nipples to rotate the same, the nipples being located so as to have their feet project beyond the front ends of the retainer cylinders 60. Then the front ends of the joints 69 strike the rear ends of the retainer cylinders 60, and the successive advance of the sections of the electric motors 59 causes the retainer cylinders 60 to advance along the guide rods 65, against the resilient force of the back springs 75 and thus urges rotating nipples N against the tips of the spokes which have been preset in the spoke holes of the rim R. Accordingly, the thread-mating of the nipples N is commenced. However, as this function proceeds, the tips of the thin rod portions 71 strike the tips of the spokes, so that the advance of the driver shafts 70 is blocked. Thus the thread-mating is not carried out thereafter, and the number of turns for thread-mating the nipple is limited to a fixed value. Although the retainer cylinders 60 and the sections of electric motors 59 may continue to advance thereafter to some extent in contrast to the blocked driver shafts 70, it then results in compression of the buffer springs 75 and thus the blocking of the driver shafts may be successfully carried out. When the driver devices D reach such a state, the time preset by the timing relay TR-05 will expire, so that the timing relay TR-05 and the relay 06 may be released, and the solenoid SOL-3 may operate to open the other hydraulic path, which actuates the cylinders 56 in the driver device D and the cylinder 84 in the spoke holding device F inversely to the operation described above, and in the cylinder 56, the sections of electric motors 59 are retreated and simultaneously the retainer cylinders 60 are retreated via the springs 66. Thereupon, since the tip end portions 60a of the retainer cylinders 60 can be opened, the nipples threadedly mated with the spokes are left on the spokes. Also in the cylinders 84, the spoke push rods 86 are raised.

During the period when the aforementioned operation proceeds, the operator at the position 0 sets the next two spokes similarly to that described above. Even though the relay 06 is released and the respective parts are restored to their home positions, the machine enters into the next step as the relay 07 continues to operate. In the next step, the limit switch LS-2 is again actuated to operate the relay 04, and thereby the aforementioned operations (removing the piston rod 44 from the notch 32 and advancing the rim positioning table 1 by one unit) are repeated, so that the nipples may be threadedly mated with the tips of the spokes successively. When such operations have been repeated nine times, the rim positioning table 1 completes one revolution, and then the bridging of 18 spokes has been completed across all the spoke holes in the lower side flange of the hub and all the spoke holes along the lower row in the circumferential direction of the rim, and the thread-mating of the nipples with these spokes has been completed. When such a state arises, the projection 30a of the rotary disc 30 comes to the position of the limit switch LS-3 and strikes thereto, and so the auxiliary relay 08 operates to actuate the relay 09 which in turn actuates the solenoid SOL-4. Accordingly, the cylinder 41 in the driving mechanism C and the cylinders 51 in the displacement mechanism E are operated. In the cylinder 41, the piston rod 42 is retreated to rotate the rotary disc 30 in the same direction by the intermediary of the cylinder 43 and the piston rod 44 for displacing the rim set in position over the range $L_2$ in FIG. 24, while in the cylinder 51, the piston rod 52 rises to raise the level of the axes of the retainer cylinders 60 over the range $M_2$ in FIG. 24 by the intermediary of the platform 55. Therefore, the driver shafts 70 are to be opposed to two spoke holes on the upper row in the circumferential direction of the rim. Now if the pushbutton switch $Pb_3$ is depressed again, the same operations as described above are repeated nine times, and consequently the nipples are threadedly mated with the 18 spokes respectively located in the spoke holes on the upper row of the rim.

In this way the thread-mating of the nipples with all the 36 spokes has been finished. Thus, the rotary disc 30 has completed another revolution and contacts its projection 30a with the limit switch LS-3, and so the above-mentioned operation is stopped. Now if the pushbutton switch $Pb_4$ is depressed, the relay 09 is released resulting in actuation of the solenoid SOL-4 to open the other hydraulic path, so that the driver devices D and the rim positioning table A return to their starting positions through the operations of the cylinders 51 and 41.

While the present invention has been described above with reference to a preferred embodiment, it is intended that the present invention should not be limited only to such embodiment, since various changes in design could be made within the scope of the invention without departing from the spirit thereof.

What is claimed is:

1. A machine for provisionally assembling wire spoke wheels including a hub, a rim and a plurality of spokes connecting said hub and rim; said machine comprising a rim positioning table having an integral shaft extending therethrough, said shaft being rotatably mounted and including a hub supporting cylinder for supporting said hub; rim retainer means disposed on the peripheral portion of said rim positioning table for radial inward movement to grip said rim at a plurality of peripheral locations thereof when said rim is positioned on said rim positioning table; an intermittent drive mechanism operatively connected to said rim positioning table for selectively imparting rotation thereto; nipple driver means located adjacent the periphery of said rim positioning table and including a selectively rotatable driving shaft aligned radially with said rim positioning table; nipple supply means positioned adjacent said driver means for supplying nipples one by one thereto; means connected to said driver means for moving said driver means in the vertical direction for a predetermined distance; means connected to said driver means for advancing or retreating said driver means radially toward or away from said rim positioning table; and a spoke holding device including a vertically movable bar located above the periphery of said rim positioning table adjacent said driver means and means to move said bar vertically downwardly to clamp said spokes against said rim positioning table.

2. A machine as claimed in claim 1 wherein said rim positioning table is formed in a cuplike shape and including along the outer periphery thereof a horizontal rim loading surface and an annular ridge extending upwardly from said rim loading surface, said ridge having equally spaced therein a plurality equal to the number of said plurality of spokes of spoke supporting notches.

3. A machine as claimed in claim 2, wherein said rim retainer means comprises an annular member having a plurality obliquely elongated holes therein and contacting the inner edge of said annular ridge, an equal plurality of rods extending radially through said rim positioning table, the inner end of each of said rods having affixed thereto a bolt extending through one of said elongated holes, the outer end of each of said rods having a holding piece for gripping said rim, and a handle operatively connected to said annular member for imparting rotation thereto along the length of said elongated holes.

4. A machine as claimed in claim 3, wherein said intermittent drive mechanism comprises a rotary disc having a plurality of notches in the periphery thereof and fixedly secured to said rim positioning table, an advancing plate rotatably mounted on said rim positioning table and having an advancing claw engageable with said notches, and a hydraulic cylinder connected to said advancing plate for rotating said advancing plate and thereby said rim positioning table a predetermined amount.

5. A machine as claimed in claim 4, wherein said driver means comprises a nipple retainer cylinder surrounding said driving shaft for retaining a nipple in a predetermined position.

6. A machine as claimed in claim 5, further characterized in that said means for advancing or retreating said driver means comprises a sliding pedestal supporting an electric motor connected to said driving shaft, a first hydraulic cylinder for advancing or retreating said sliding pedestal, and a platform supporting said sliding pedestal and said first hydraulic cylinder, and said means for moving said driver means in the vertical direction comprises a second hydraulic cylinder mounted for displacing said platform vertically.

7. A machine as claimed in claim 6, wherein said means to move said bar vertically downwardly comprises a third hydraulic cylinder attached to said bar at the end thereof opposite said rim positioning table.

8. A machine as claimed in claim 7, wherein said nipple supply means comprises a hopper mounted adjacent said driver means and having a chute connected to said driver means, a scoop-up member vertically reciprocating in said hopper, and partition means for ejecting said nipples into said chute one by one.

* * * * *